United States Patent
Gress et al.

(10) Patent No.: US 7,092,728 B1
(45) Date of Patent: Aug. 15, 2006

(54) UNIFIED MESSAGING SYSTEM CONFIGURED FOR CONVERTING SHORT MESSAGE SERVICE MESSAGES TO AUDIBLE MESSAGES

(75) Inventors: David S. Gress, Mechanicsville, VA (US); Robert James Lockwood, Richmond, VA (US); Robert Raymond Sealey, Venus Mansion (SG)

(73) Assignee: Cisco Technology, Inc., San Jose, CA (US)

( * ) Notice: Subject to any disclaimer, the term of this patent is extended or adjusted under 35 U.S.C. 154(b) by 784 days.

(21) Appl. No.: 09/846,225

(22) Filed: May 2, 2001

Related U.S. Application Data

(63) Continuation-in-part of application No. 09/739,687, filed on Dec. 20, 2000.

(51) Int. Cl.
*H04Q 7/20* (2006.01)

(52) U.S. Cl. .................... 455/466; 455/563; 704/275

(58) Field of Classification Search ............. 455/466, 455/550.1, 414.4, 563, 412.1, 413, 414.1, 455/414.2, 67.7, 79, 116, 445, 432.2; 379/88.12; 704/260, 275; 709/206
See application file for complete search history.

(56) References Cited

U.S. PATENT DOCUMENTS

| | | | | |
|---|---|---|---|---|
| 4,837,798 A | | 6/1989 | Cohen et al. | |
| 5,640,590 A | * | 6/1997 | Luther | 715/500.1 |
| 5,799,279 A | * | 8/1998 | Gould et al. | 704/275 |
| 5,832,221 A | * | 11/1998 | Jones | 709/206 |
| 5,950,123 A | * | 9/1999 | Schwelb et al. | 455/414.4 |
| 6,665,378 B1 | * | 12/2003 | Spielman et al. | 379/88.12 |
| 6,944,593 B1 | * | 9/2005 | Kuzunuki et al. | 704/275 |
| 2003/0078989 A1 | * | 4/2003 | Ladd | 709/218 |

\* cited by examiner

*Primary Examiner*—Eliseo Ramos-Feliciano
(74) *Attorney, Agent, or Firm*—Leon R. Turkevich

(57) ABSTRACT

A unified communications system includes an SMS command processor configured for executing prescribed messaging operations based on reception of an SMS message having respective prescribed commands, and a text-to-speech resource configured for controlling conversion of the SMS message into an audible message. The SMS command processor parses the received SMS message for the prescribed command, and executes the prescribed command as necessary. In response to detecting a text-to-speech command, the SMS command processor invokes the text-to-speech resource for conversion of the SMS message into an audible message. The SMS command processor outputs the audible message for delivery of the audible message, for example using a notification service that initiates an outgoing telephone call to a messaging destination specified in the SMS message, or by establishing a voice over IP telephone connection with the messaging destination and playing the audible message.

42 Claims, 2 Drawing Sheets

UNIFIED MESSAGING SYSTEM CONFIGURED FOR CONVERTING SHORT MESSAGE SERVICE MESSAGES TO AUDIBLE MESSAGES

CROSS REFERENCE TO RELATED APPLICATIONS

This application is a continuation-in-part of commonly assigned, copending application Ser. No. 09/739,687, filed Dec. 20, 2000, the disclosure of which is incorporated in its entirety herein by reference.

BACKGROUND OF THE INVENTION

1. Field of the Invention

The present invention relates to unified messaging systems configured for receiving, storing, and supplying Short Message Service (SMS) messages to a subscriber.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

Short Message Services (SMS) have been implemented in wireless telephone communications systems as a way to send a message to a subscriber's wireless phone. SMS messages have become quite popular recently, due in part from wireless telephone service providers offering SMS as a free service in conjunction with wireless telephony services; hence, many wireless subscribers have developed a preference to communicating using SMS as opposed to more costly wireless voice services. A messaging server, also referred to as a Short Message Service Center (SMSC), is configured for receiving an SMS message from a messaging source according to Short Message Peer to Peer Protocol (SMPP). The messaging source may be, for example, a cellphone supplying a user-input message, or an e-mail interface resident within the wireless telephone communications system. The SMSC, in response to receiving the SMS message from the messaging source, transmits a short message to the cellular phone based on the destination telephone number specified within the notification message. However, this arrangement still provides only limited flexibility in enabling different sources to send an SMS message to a cellular phone. In addition, existing cellphones are limited by memory to storing up to ten SMS messages. Moreover, this arrangement limits the ability of an SMS subscriber having a cellphone to send messages to a destination that does not have an SMS-capable cellphone.

Unified communications systems are under development as a way of enhancing messaging services for users such as wireless telephone subscribers. A disadvantage of unified communications systems implemented as enhanced versions of the voice mail system, paging system, or e-mail interface resident within the wireless telephone communications system is that such implementation requires detailed knowledge of the proprietary protocols associated with the voice mail systems. Hence, such implementations are available only from switch vendors having knowledge of the proprietary protocols.

Use of a unified communications system implemented independent of the existing proprietary voice mail systems enables service providers to use scalable and distributed systems using recognized communication protocols. Hence, the service providers may use such unified communications systems across multiple platforms, independent of protocol, for storage of various types of messages, for example voice messages, facsimile, and e-mail stored in a centralized messaging store.

Commonly-assigned, copending application Ser. No. 09/739,687, filed Dec. 20, 2000, entitled Unified Messaging System Configured for Management of Short Message Service Type Messages, the disclosure of which is incorporated in its entirety herein by reference, discloses a unified communications system including an SMS module configured for receiving SMS messages according to SMPP protocol. The SMS module obtains source and destination information from the received SMS message, and accesses a subscriber profile directory for subscriber profile information based on at least one of the source and destination information. The SMS module generates a common format message that includes the SMS message, and selectively supplies the common format message to selected destinations based on the accessed subscriber profile information. The common format message may be stored in a prescribed message store, for example an IMAP directory, or output as an e-mail message to a prescribed destination. The SMS module also is configured for selectively supplying stored messages to a unified messaging subscriber as an SMS message based on the profile information on the unified messaging subscriber. Hence, the unified communications system enables SMS messaging users to send SMS messages to non SMS-type devices (e.g., telephones, e-mail clients, etc.) and retrieve stored common format messages (e.g., fax, e-mail, voice messages) using the SMS message system.

Hence, the above-incorporated application Ser. No. 09/739,687 discloses converting the SMS message into a common format message which then can be retrieved by, for example, an SMS destination subscriber using alternate message formats according to the destination subscriber preferences. Instances may arise, however, where an SMS subscriber wishes to send a message to a destination using SMS messaging, regardless of whether the destination has SMS capabilities; for example, an SMS subscriber may wish to send a message using SMS messaging to a destination having only a telephone, without requiring the user at the destination to initiate a messaging session with the unified communications system in order to retrieve the message.

SUMMARY OF THE INVENTION

There is a need for an arrangement that enables a unified messaging system to convert a received SMS message to an audible message for an audio-based destination device (e.g., telephone).

There also is a need for arrangement that enables a user sending an SMS message to specify that the SMS message is to be converted into an audible format prior to delivery to at least one destination subscriber.

There also is a need for an arrangement that enables a user sending an SMS message to have the message converted into an audible message, and have the audible message immediately delivered to a specified destination.

These and other needs are attained by the present invention, where a unified communications system includes an SMS command processor configured for executing prescribed messaging operations based on reception of an SMS message having respective prescribed commands, and a text-to-speech resource configured for controlling conversion of the SMS message into an audible message. The SMS command processor is configured for receiving the SMS message based on the SMS message specifying a processing destination that corresponds to the processing address for the SMS command processor. The SMS message may be generated by the unified messaging subscriber requesting text-to-speech translation for a messaging destination, or from another agent configured for generating the SMS message based on a prescribed event. The SMS command processor parses the received SMS message for the prescribed command, and executes the prescribed command as necessary. In this case, the SMS command processor, in response to detecting a text-to-speech command, invokes the text-to-speech resource for conversion of the SMS message into an audible message. The SMS command processor outputs the audible message for delivery of the audible message, for example using a notification service that initiates an outgoing telephone call to a messaging destination specified in the SMS message. Hence, SMS messaging users can send audible messages to a messaging destination using text-to-speech resource available by the unified communications system.

One aspect of the present invention provides a method in a server configured for executing messaging operations. The method includes receiving a short message service (SMS) message that specifies a text-to-speech messaging command, a text-based message, and a messaging destination. The method also includes detecting the text-to-speech messaging command during parsing of the SMS message, and invoking a text-to-speech resource for conversion of the text-based message into an audible message in response to detecting the text-to-speech messaging command. The audible message is output for delivery to the messaging destination.

Another aspect of the present invention provides a server configured for executing messaging operations. The server includes an an interface configured for receiving a short message service (SMS) message, containing a text-to-speech messaging command, a text-based message, and a messaging destination, according to a prescribed network protocol. The server also includes a text-to-speech resource interface configured for controlling conversion of the text-based message into an audible message, and an SMS command processor. The SMS command processor is configured for parsing the SMS message and invoking the text-to-speech resource for conversion of the text-based message into the audible message in response to detecting the text-to-speech messaging command. The SMS command processor also is configured for outputting the audible message for delivery to the messaging destination. Hence, SMS messages can be sent to non-SMS destinations by converting the SMS messages into audible messages, and playing the audible messages for the destination.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
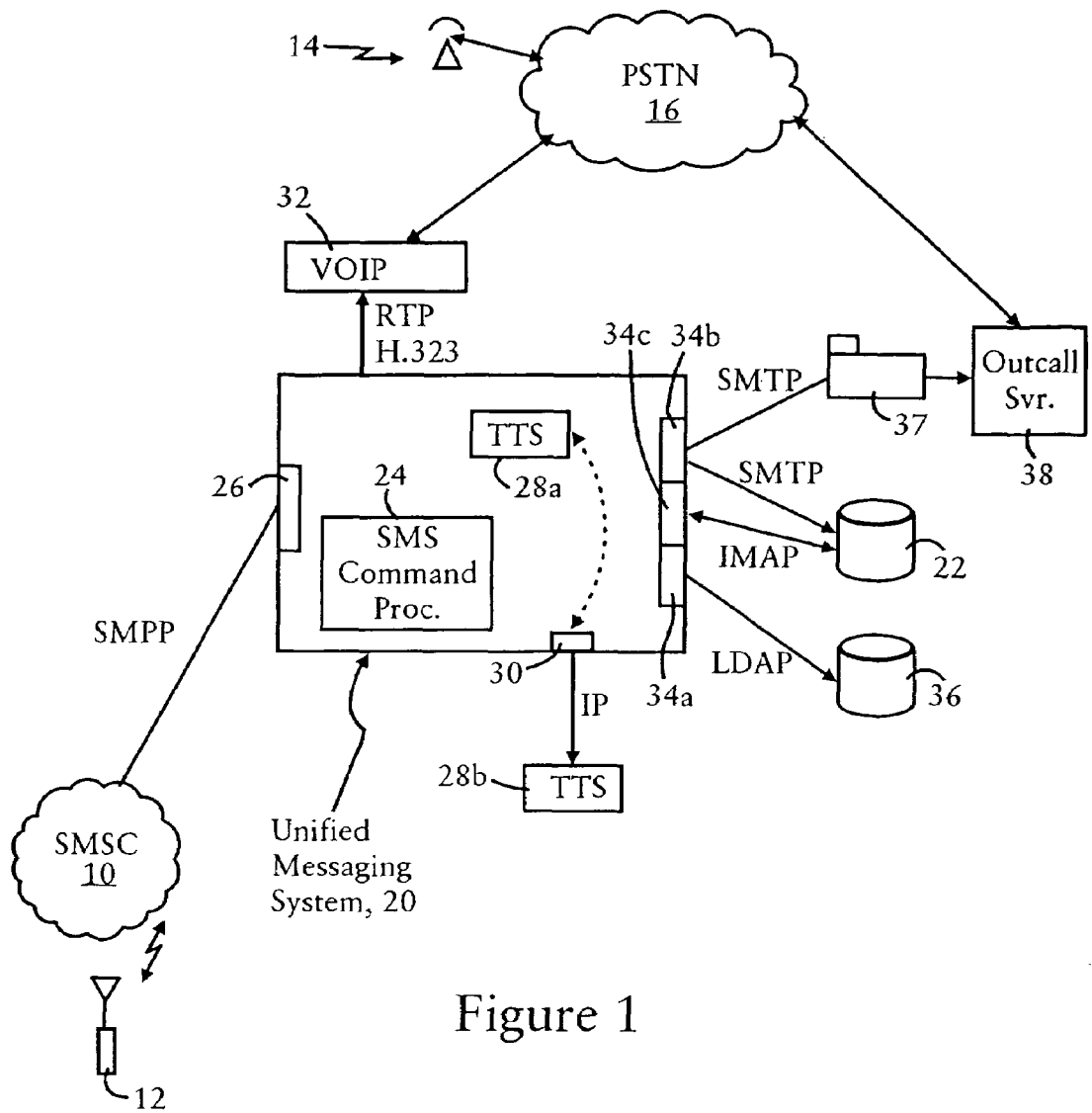
FIG. 1 is a block diagram illustrating a unified messaging system configured for converting SMS messages into audible messages for non-SMS subscribers, according to an embodiment of the present invention.

FIG. 1 is a block diagram illustrating an architecture that provides unified messaging services via an IP network, including sending an SMS message from a wireless SMS device as an audible message for a user of a non-SMS audible device (e.g., a telephone) 14, according to an embodiment of the present invention. The architecture includes an SMSC 10 configured for sending and receiving SMS messages to and from wireless SMS devices 12, and for selectively forwarding SMS messages to peer systems via SMPP protocol. The architecture also includes a unified messaging system 20 configured for receipt, storage, and retrieval of messages stored in a subscriber message store 22, independent of the message type. An exemplary implementation of the unified messaging system 20 is the commercially available Cisco Unified Open Network Exchange (Cisco uOne) (Products UONE-FOUND 4.1S, and UONE-VOICEMSG4.1S) from Cisco Systems, Inc.

The above-incorporated application Ser. No. 09/739,687, discloses an arrangement that enables SMS messages to be managed as true message types that can be received, stored, and retrieved from the unified messaging system 20. The disclosed embodiment further enhances the existing Cisco uOne system by adding within the unified messaging system 20 an SMS command processor 24 configured for sending and receiving SMS messages via an SMPP interface 26 according to SMPP protocol.

Moreover, the SMS command processor 24 is configured for parsing a received SMS message for a prescribed messaging command; if a prescribed messaging command is detected within the SMS message, the SMS command processor 24 is configured for executing a prescribed messaging operation based on the prescribed messaging command. The prescribed messaging operation may include, for example, retrieving a list for the subscriber of stored messages within the subscriber message store 22, deleting a message, or obtaining subscriber-selected external information (e.g., selected stock quotes) from a remote server via an IP-based network such as the Internet, etc. In particular, the prescribed messaging operations are executed based on function calls (i.e., procedure calls) by the SMS command processor 24 to independently executable resources (e.g., API's, agents, etc.).

As described in further detail below, the disclosed arrangement enables the SMS command processor 24 to invoke a text-to-speech resource 28 for conversion of the text-based message within the received SMS message into an audible message (e.g., a .wav file) for playback on an audio device that lacks SMS capabilities, for example a telephone 14. As illustrated in FIG. 1, the server executing the unified messaging system 20 includes a text-to-speech resource interface 30 configured for controlling conversion of the text-based message into an audible message, for example by issuing a procedure call to an independently executable text-to-speech resource 28a executable within the server 20, or by outputting via an IP connection a request to the text-to-speech resource 28b executable by a remote server. The SMS command processor 24, in response to detecting a text-to-speech messaging command during parsing of the SMS message, issues a request for the text-to-speech resource interface 30 to invoke one of the text-to-speech resources 28. Once the text-to-speech resource 28 has converted the text-based message into an audible message, the SMS command processor 24 outputs the audible message for delivery to the messaging destination 14.

Delivery of the audible message may be performed using various techniques. For example, the unified messaging system 20 may request a voice over IP resource 32 to establish an audible connection with the messaging destination 14, for example via the public switched telephone network 16. An exemplary voice over IP resource 32 is the commercially available Cisco AS5300 Universal Access Server from Cisco Systems, Inc., configured for establishing Real Time Protocol (RTP) data stream connections according to H.323 protocol.

The SMS command processor 24 also is configured for accessing standardized application programming interfaces (APIs) 34 executable within the unified messaging system 20. Hence, the SMS command processor 24 is able to access an LDAP API 34a for subscriber profile information from a subscriber directory 36 according to LDAP protocol: such subscriber profile information may include an e-mail address of a mailbox 37 (e.g., POP3 or IMAP) for an outcall server 38. The SMS command processor 24 is configured for generating an e-mail message that specifies the e-mail address of the outcall server mailbox 37 as the destination address, and which specifies the messaging destination (e.g., telephone number) for the attached audible message (e.g., .wav file). The SMS command processor 24 outputs the e-mail message using an SMTP API 34b.

The unified messaging system 20 also includes an IMAP API 34c, enabling the SMS command processor 24 to output a received SMS message to an IMAP message store 22, for example if the SMS message specifies a command for storing the audible message in a voice mailbox, as opposed to another message specifying immediate notification by initiating a call to the destination 14. Additional details related to alternate notification arrangements are disclosed in commonly assigned, copending application Ser. No. 09/629, 053, filed Jul. 31, 2000, entitled IP-Based Notification Architecture for Unified Messaging, the disclosure of which is incorporated in its entirety herein by reference.

Figure 2:
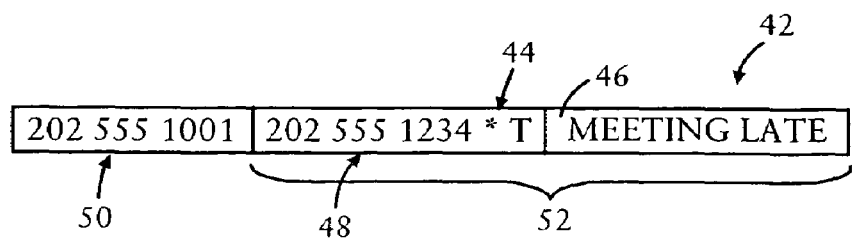
FIG. 2 is a diagram illustrating received SMS messages having messaging commands executable by the SMS command processor of FIG. 1.
Figure 3:
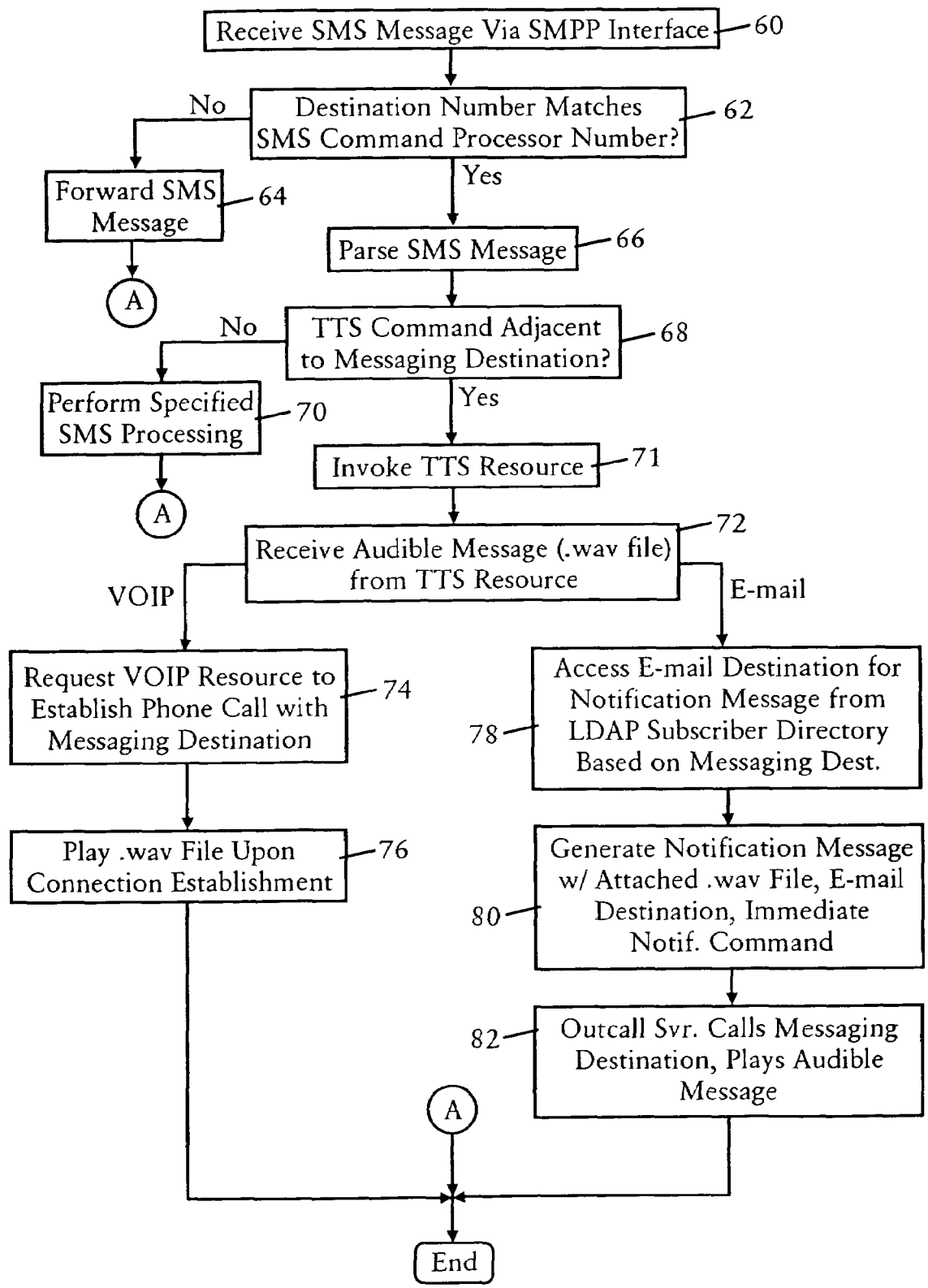
FIG. 3 is a diagram illustrating the method of sending SMS messages to non-SMS subscribers according to an embodiment of the present invention.

FIG. 2 is a diagram illustrating an SMS message 42 (typically composed of unicode text) having a text-to-speech messaging command 44 (e.g., "*T"), a text-based message 46, a messaging destination 48, and the destination number 50 that corresponds to the assigned telephone number for the SMS command processor 24. FIG. 3 is a diagram illustrating the text-to-speech operations performed by the SMS command processor 24 in response to reception of an SMS message 42 having an SMS command 46, according to an embodiment of the present invention. The steps described in FIG. 3 can be implemented as executable code stored on a computer readable medium (e.g., a hard disk drive, a floppy drive, a random access memory, a read only memory, an EPROM, a compact disc, etc.).

The method begins in step 60, where the SMS command processor 24 receives the SMS message 42 via the SMPP interface 26 according to SMPP protocol. The SMSC 10 forwards the SMS message 42 to the SMPP interface 26 based on the destination number 50. The SMS command processor 24 determines in step 62 whether the destination number 50 matches the assigned SMS command processor number; if the destination number 50 does not match the SMS processor number, the SMS processor 24 forwards the SMS message 42 in step 64.

If in step 62 the destination number 50 matches the SMS command processor number, the SMS command processor 24 parses in step 66 the SMS message for the messaging destination number 48 and the messaging command, in this example the text-to-speech messaging command 44. If in step 68 the SMS command processor 24 detects a command other than the text-to-speech command 44 adjacent to the messaging destination 48, the SMS command processor 24 performs the specified SMS processing in step 70. Additional details related to generic SMS processing by the SMS command processor are disclosed in commonly assigned, copending application Ser. No. 09/846,224, filed May 2, 2001, entitled Unified Messaging System Having Short Message Service Command Processor, the disclosure of which is incorporated in its entirety herein by reference.

The SMS command processor 24, in response to detecting in step 68 the text-to-speech messaging command 44 adjacent to the messaging destination 48, sends in step 71 a request to the text-to-speech resource interface 30 to invoke one of the text-to-speech (TTS) resources 28 for conversion of the text-based message 46 into an audible message, for example a .wav file. Note the .wav file may include an introductory portion announcing the message, the source of the message (i.e., the SMS subscriber that originated the call) included as part of the header of the received SMS message, as well as the message 46. The SMS command processor 24 receives in step 72 the audible message from the TTS resource 28 via the text-to-speech resource interface 30.

If the unified messaging system 20 is configured for initiating an RTP data stream with a voice over IP resource 32, the SMS command processor 24 can play the audible message in response to establishment of the audible connection with the destination telephone 14. In particular, the SMS command processor 24 requests in step 74 the voice over IP (VOIP) resource 32 to establish a phone call with the messaging destination 14. The SMS command processor 24 plays the audible message in step 76 once the connection is established between the unified communications system 20 and the messaging destination 14 by the voice over IP resource 32 (e.g., once the voice over IP resource 32 acknowledges establishment of the RTP media stream with the unified communications system 20 and the telephone connection with the messaging destination 74.

If the unified communications system 20 is not configured for initiating and RTP data stream, the SMS command processor 24 generates a notification message with a prescribed command specifying that the outcall server 38 immediately calls the messaging destination 14 and plays the audible message. Specifically, the SMS command processor 24 performs an LDAP query in step 78 based on the messaging destination 48 in order to obtain an e-mail address for a notification resource, for example the mailbox 37 for the outcall server 38. The SMS command processor 24 generates in step 80 a notification message in the form of an e-mail message that includes the audible message, the e-mail destination address for the outcall server mailbox 37, and an immediate notification command, if necessary. The notification message is that outputs via the SMTP API 34b, enabling the outcall server 38 to call the messaging destination and play the audible message in step 82.

According to the disclosed embodiment, SMS messages can be used as a command interface by a subscriber, or by a resource configured for generating SMS messages, enabling execution of application operations based on the executable commands within the SMS message. Moreover, the use of the SMS command processor enables an SMS user to access text-to-speech resources, enabling an SMS message to be delivered to a non SMS subscriber, for example a telephony subscriber.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a server configured for executing messaging operations, the method comprising:
   receiving a short message service (SMS) message, having been generated by a sender, that specifies a text-to-speech messaging command, a text-based message, and a messaging destination;
   detecting the text-to-speech messaging command during parsing of the SMS message;
   invoking a text-to-speech resource for conversion of the text-based message into an audible message in response to detecting the text-to-speech messaging command; and
   outputting the audible message for delivery to the messaging destination.

2. The method of claim 1, wherein the receiving step includes determining that the SMS message includes a destination number that corresponds to an SMS command processor within the server.

3. The method of claim 1, wherein the detecting step includes detecting the text-to-speech messaging command as a prescribed character within the SMS message.

4. The method of claim 3, wherein the detecting step further includes detecting the text-to-speech messaging command adjacent to the messaging destination.

5. The method of claim 1, wherein the invoking step includes issuing a procedure call to the text-to-speech resource, the text-to-speech resource executable within the server.

6. The method of claim 1, wherein the invoking step includes outputting a request to a second server, configured for executing the text-to-speech resource, according to an IP based protocol.

7. The method of claim 1, wherein the outputting step includes outputting a notification message, including the audible message and specifying the messaging destination, to a notification resource configured for notifying the messaging destination with the audible message.

8. The method of claim 7, wherein the outputting step further includes generating the notification message including the audible message, the messaging destination, and a prescribed command specifying immediate notification at the messaging destination.

9. The method of claim 8, wherein the outputting step further includes outputting the notification message according to SMTP protocol.

10. The method of claim 9, further comprising obtaining an e-mail destination for the notification message by accessing a subscriber profile directory based on the messaging destination and according to LDAP protocol.

11. The method of claim 1, wherein the outputting step includes:
    requesting a voice over IP resource to establish an audible connection with the messaging destination; and
    playing the audible message in response to establishment of the audible connection.

12. A server configured for executing messaging operations, the server including:
    an interface configured for receiving a short message service (SMS) message, having been generated by a sender and containing a text-to-speech messaging command, a text-based message, and a messaging destination, according to a prescribed network protocol;
    a text-to-speech resource interface configured for controlling conversion of the text-based message into an audible message; and
    an SMS command processor configured for parsing the SMS message and invoking the text-to-speech resource for conversion of the text-based message into the audible message in response to detecting the text-to-speech messaging command, the SMS command processor configured for outputting the audible message for delivery to the messaging destination.

13. The server of claim 12, wherein the interface is configured for receiving the SMS message according to SMPP protocol.

14. The server of claim 12, further comprising a text-to-speech resource configured for converting the text based message into the audible message, the text-to-speech resource interface configured for issuing a procedure call to the text-to-speech resource in response to a request from the SMS command processor.

15. The server of claim 12, wherein the text-to-speech resource interface is configured for outputting a request to a second server, configured for executing the text-to-speech conversion, according to an IP based protocol.

16. The server of claim 12, wherein SMS command processor is configured for outputting the audible message by generating a notification message that contains the audible message and the messaging destination, and outputting the notification message to a notification resource configured for notifying the messaging destination with the audible message.

17. The server of claim 16, wherein the SMS command processor is configured for outputting the notification message according to SMTP protocol.

18. The server of claim 17, wherein the SMS command processor is configured for obtaining an e-mail destination for the notification message by accessing a subscriber profile directory based on the messaging destination and according to LDAP protocol.

19. The server of claim 12, wherein the SMS command processor is configured for outputting the audible message by requesting a voice over IP resource to establish an audible connection with the messaging destination, the SMS command processor configured for playing the audible message in response to establishment of the audible connection.

20. The server of claim 12, wherein the SMS command processor is configured for parsing the SMS message in response to detecting in the SMS message a destination number that matches an assigned number for the SMS command processor.

21. A computer readable medium having stored thereon sequences of instructions for receiving a short message service (SMS) message by a server, the sequences of instructions including instructions for performing the steps of:

receiving a short message service (SMS) message, having been generated by a sender, that specifies a text-to-speech messaging command, a text-based message, and a messaging destination;

detecting the text-to-speech messaging command during parsing of the SMS message;

invoking a text-to-speech resource for conversion of the text-based message into an audible message in response to detecting the text-to-speech messaging command; and outputting the audible message for delivery to the messaging destination.

22. The medium of claim 21, wherein the receiving step includes determining that the SMS message includes a destination number that corresponds to an SMS command processor within the server.

23. The medium of claim 21, wherein the detecting step includes detecting the text-to-speech messaging command as a prescribed character within the SMS message.

24. The medium of claim 23, wherein the detecting step further includes detecting the text-to-speech messaging command adjacent to the messaging destination.

25. The medium of claim 21, wherein the invoking step includes issuing a procedure call to the text-to-speech resource, the text-to-speech resource executable within the server.

26. The medium of claim 21, wherein the invoking step includes outputting a request to a second server, configured for executing the text-to-speech resource, according to an IP based protocol.

27. The medium of claim 21, wherein the outputting step includes outputting a notification message, including the audible message and specifying the messaging destination, to a notification resource configured for notifying the messaging destination with the audible message.

28. The medium of claim 27, wherein the outputting step further includes generating the notification message including the audible message, the messaging destination, and a prescribed command specifying immediate notification at the messaging destination.

29. The medium of claim 28, wherein the outputting step further includes outputting the notification message according to SMTP protocol.

30. The medium of claim 29, further comprising instructions for performing the step of obtaining an e-mail destination for the notification message by accessing a subscriber profile directory based on the messaging destination and according to LDAP protocol.

31. The medium of claim 21, wherein the outputting step includes:

requesting a voice over IP resource to establish an audible connection with the messaging destination; and playing the audible message in response to establishment of the audible connection.

32. A server comprising:

means for receiving a short message service (SMS) message, having been generated by a sender, that specifies a text-to-speech messaging command, a text-based message, and a messaging destination;

means for detecting the text-to-speech messaging command during parsing of the SMS message;

means for invoking a text-to-speech resource for conversion of the text-based message into an audible message in response to detecting the text-to-speech messaging command; and means for outputting the audible message for delivery to the messaging destination.

33. The server of claim 32, wherein the receiving means is configured for determining that the SMS message includes a destination number that corresponds to an SMS command processor within the server.

34. The server of claim 32, wherein the detecting means is configured for detecting the text-to-speech messaging command as a prescribed character within the SMS message.

35. The server of claim 34, wherein the detecting means is configured for detecting the text-to-speech messaging command adjacent to the messaging destination.

36. The server of claim 32, further comprising the the text-to-speech resource, wherein the invoking means is configured for issuing a procedure call to the text-to-speech resource.

37. The server of claim 32, wherein the invoking means is configured for outputting a request to a second server, configured for executing the text-to-speech resource, according to an IP based protocol.

38. The server of claim 32, wherein the outputting means is configured for outputting a notification message, including the audible message and specifying the messaging destination, to a notification resource configured for notifying the messaging destination with the audible message.

39. The server of claim 38, wherein the outputting means is configured for generating the notification message including the audible message, the messaging destination, and a prescribed command specifying immediate notification at the messaging destination.

40. The server of claim 39, wherein the outputting means is configured for outputting the notification message according to SMTP protocol.

41. The server of claim 40, further comprising means for obtaining an e-mail destination for the notification message by accessing a subscriber profile directory based on the messaging destination and according to LDAP protocol.

42. The server of claim 32, wherein the outputting means is configured for:

requesting a voice over IP resource to establish an audible connection with the messaging destination; and playing the audible message in response to establishment of the audible connection.

* * * * *